(12) United States Patent
Pani et al.

(10) Patent No.: US 9,538,425 B2
(45) Date of Patent: *Jan. 3, 2017

(54) METHOD AND APPARATUS FOR CONTROLLING A HANDOVER BETWEEN UTRA R6 CELLS AND R7 CELLS

(71) Applicant: InterDigital Technology Corporation, Wilmington, DE (US)

(72) Inventors: Diana Pani, Montreal (CA); Christopher R Cave, Dollard-des-Ormeaux (CA); Stephen E Terry, Northport, NY (US); Paul Marinier, Brossard (CA)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/956,171

(22) Filed: Dec. 1, 2015

(65) Prior Publication Data

US 2016/0088524 A1 Mar. 24, 2016

Related U.S. Application Data

(63) Continuation of application No. 14/188,244, filed on Feb. 24, 2014, now Pat. No. 9,232,442, which is a
(Continued)

(51) Int. Cl.
*H04L 1/18* (2006.01)
*H04W 36/00* (2009.01)
(Continued)

(52) U.S. Cl.
CPC ......... *H04W 36/0005* (2013.01); *H04W 36/02* (2013.01); *H04W 76/046* (2013.01);
(Continued)

(58) Field of Classification Search
None
See application file for complete search history.

(56) References Cited

U.S. PATENT DOCUMENTS 6,717,927 B2  4/2004  Chao et al.
6,901,063 B2 *  5/2005  Vayanos ............... H04L 1/1845
                                                370/335
(Continued)

FOREIGN PATENT DOCUMENTS

EP          1487161         12/2004
JP       2005-006320 A       1/2005
(Continued)

OTHER PUBLICATIONS

"3rd Generation Partnership Project, Technical Specification Group Radio Access Network; Radio Resource Control Protocol Specification (Release 7)", 3GPP TS 25.331 V7.3.0, Dec. 2006, 1316 pages.

(Continued)

*Primary Examiner* — Dang Ton
*Assistant Examiner* — Sai Aung
(74) *Attorney, Agent, or Firm* — Julian F. Santos

(57) ABSTRACT

A method and apparatus for controlling an optimization of handover procedures between universal terrestrial radio access (UTRA) release 6 (R6) cells and UTRA release 7 (R7) cells are disclosed. When a wireless transmit/receive unit (WTRU) is moving between an R6 cell and an R7 cell, or between R7 cells, a handover is initiated from a source Node-B to a target Node-B. In the R7 cell, the enhanced medium access control (MAC) functionality including flexible radio link control (RLC) protocol data unit (PDU) size and high speed MAC (MAC-hs) segmentation and multiplexing of different priority queues are supported. After the handover, a MAC layer and/or an RLC layer are reconfig- (Continued)

ured or reset based on functionality supported by the target Node-B.

20 Claims, 2 Drawing Sheets

Related U.S. Application Data continuation of application No. 13/216,564, filed on Aug. 24, 2011, now Pat. No. 8,705,489, which is a continuation of application No. 12/024,539, filed on Feb. 1, 2008, now Pat. No. 8,320,327.

(60) Provisional application No. 60/887,896, filed on Feb. 2, 2007, provisional application No. 60/895,338, filed on Mar. 16, 2007, provisional application No. 60/908,076, filed on Mar. 26, 2007, provisional application No. 60/914,189, filed on Apr. 26, 2007.

(51) Int. Cl.
*H04W 36/02* (2009.01)
*H04W 28/06* (2009.01)
*H04W 36/14* (2009.01)
*H04W 76/04* (2009.01)

(52) U.S. Cl.
CPC ......... *H04L 1/1822* (2013.01); *H04W 28/065* (2013.01); *H04W 36/14* (2013.01); *H04W 76/041* (2013.01)

(56) References Cited

U.S. PATENT DOCUMENTS

| | | | |
|---|---|---|---|
| 6,987,981 B2 | 1/2006 | Kuo | |
| 7,046,648 B2 | 5/2006 | Zhang et al. | |
| 7,123,603 B2 | 10/2006 | Houzel | |
| 7,283,508 B2* | 10/2007 | Choi | H04B 7/2637 370/328 |
| 7,286,563 B2* | 10/2007 | Chang | H04L 1/1803 370/342 |
| 7,447,504 B2* | 11/2008 | Lohr | H04L 1/1822 370/242 |
| 7,447,968 B2 | 11/2008 | Ha et al. | |
| 7,522,560 B2 | 4/2009 | Soderstrom et al. | |
| 7,525,944 B2 | 4/2009 | Vayanos et al. | |
| 7,639,659 B2* | 12/2009 | Ha | H04L 1/0003 370/209 |
| 7,657,815 B2 | 2/2010 | Seidel et al. | |
| 7,701,922 B2 | 4/2010 | Terry | |
| 7,839,852 B2 | 11/2010 | Liu et al. | |
| 8,130,706 B2 | 3/2012 | Pani et al. | |
| 8,130,720 B2 | 3/2012 | Zhang et al. | |
| 8,285,330 B2 | 10/2012 | Lee et al. | |
| 8,325,656 B2* | 12/2012 | Lindskog | H04L 1/0078 370/329 |
| 8,351,400 B2 | 1/2013 | Damnjanovic et al. | |
| 2003/0016698 A1 | 1/2003 | Chang et al. | |
| 2003/0147370 A1 | 8/2003 | Wu | |
| 2003/0189909 A1 | 10/2003 | Chao et al. | |
| 2003/0206534 A1 | 11/2003 | Wu | |
| 2003/0210676 A1 | 11/2003 | Wu | |
| 2004/0052229 A1 | 3/2004 | Terry et al. | |
| 2004/0228313 A1 | 11/2004 | Cheng et al. | |
| 2004/0252719 A1 | 12/2004 | Jami et al. | |
| 2005/0009527 A1 | 1/2005 | Sharma | |
| 2005/0096054 A1 | 5/2005 | Zhang et al. | |
| 2005/0147040 A1 | 7/2005 | Vayanos et al. | |
| 2005/0169205 A1 | 8/2005 | Grilli et al. | |
| 2005/0193309 A1 | 9/2005 | Grilli et al. | |
| 2005/0249140 A1 | 11/2005 | Lee et al. | |
| 2006/0092972 A1 | 5/2006 | Petrovic et al. | |
| 2006/0092973 A1 | 5/2006 | Petrovic et al. | |
| 2006/0281413 A1 | 12/2006 | Burbidge | |
| 2006/0293055 A1 | 12/2006 | Pirskanen | |
| 2007/0047452 A1 | 3/2007 | Lohr et al. | |
| 2007/0155335 A1 | 7/2007 | Love et al. | |
| 2007/0280207 A1* | 12/2007 | Shimizu | H04L 29/1233 370/353 |
| 2008/0064390 A1 | 3/2008 | Kim | |
| 2008/0101411 A1 | 5/2008 | Takahashi et al. | |
| 2008/0198763 A1 | 8/2008 | Fischer et al. | |
| 2008/0254800 A1 | 10/2008 | Chun et al. | |
| 2008/0285538 A1 | 11/2008 | Wu | |
| 2008/0310338 A1 | 12/2008 | Charpenter et al. | |
| 2009/0185535 A1 | 7/2009 | Lee et al. | |
| 2009/0296668 A1 | 12/2009 | Capone | |
| 2010/0061324 A1 | 3/2010 | Liao et al. | |

FOREIGN PATENT DOCUMENTS

| | | |
|---|---|---|
| JP | 2005-539468 A | 12/2005 |
| JP | 2006-166479 A | 6/2006 |
| KR | 10-2004-0068057 | 7/2004 |
| KR | 10-2004-0111002 | 12/2004 |
| RU | 2263415 | 11/2003 |
| RU | 2 287 220 | 11/2006 |
| WO | WO-01/30103 | 4/2001 |
| WO | WO-03/058852 A1 | 7/2003 |
| WO | WO-03/096617 | 11/2003 |
| WO | WO-2004/025842 | 3/2004 |
| WO | WO-2004/091130 | 10/2004 |
| WO | WO-2005/018241 | 2/2005 |
| WO | WO-2005/122441 A1 | 12/2005 |
| WO | WO-2006/134480 A2 | 12/2006 |
| WO | WO-2006/135482 | 12/2006 |
| WO | WO-2007/130325 A2 | 11/2007 |
| WO | WO-2008/070682 A2 | 6/2008 |
| WO | WO-2008/075185 A2 | 6/2008 |
| WO | WO-2008/097486 A2 | 8/2008 |
| WO | WO-2008/115392 A2 | 9/2008 |

OTHER PUBLICATIONS

"3rd Generation Partnership Project: Technical Specification Group Radio Access Network; Medium Access Control (MAC) Protocol Specification (Release 7)", 3GPP TS 25.321 V7.3.0; Release 715T, Dec. 2006, 113 pages.
"3rd Generation Partnership Project; Technical Specification Group Radio Access Network; High Speed Downlink Packet Access (HSDPA) Overall Description; Stage 2 (Release 7)", 3GPP TS 25.308 V7.5.0, Dec. 2007, 50 pages.
"3rd Generation Partnership Project; Technical Specification Group Radio Access Network; High Speed Downlink Packet Access (HSDPA) Overall Description; Stage 2 (Release 8)", 3GPP TS 25.308 V8.0.0, Dec. 2007, 50 pages.
"3rd Generation Partnership Project; Technical Specification Group Radio Access Network; High Speed Downlink Packet Access (HSDPA); Overall Description; Stage 2 (Release 7)", 3GPP TS 25.308 V7.1.0, Dec. 2006, 34 pages.
"3rd Generation Partnership Project; Technical Specification Group Radio Access Network; High Speed Packet Access (HSPA) Evolution; Frequency Division Duplex (FDD) (Release 7)", 3GPP TR 25.999 V1.0.0, Nov. 2006, 43 pages.
"3rd Generation Partnership Project; Technical Specification Group Radio Access Network; High Speed Packet Access (HSPA) Evolution; Frequency Division Duplex (FDD) (Release 7)", 3GPP TR 25.999 V7.0.1, Dec. 2007, 58 pages.
"3rd Generation Partnership Project; Technical Specification Group Radio Access Network; Medium Access Control (MAC) Protocol Specification (Release 7)", 3GPP TS 25.321 V7.3.0, Dec. 2006, 113 pages.
"3rd Generation Partnership Project; Technical Specification Group Radio Access Network; Medium Access Control (MAC) Protocol Specification (Release 7)", 3GPP TS 25.321 V7.4.0, Mar. 2007, 126 pages.
"3rd Generation Partnership Project; Technical Specification Group Radio Access Network; Medium Access Control (MAC) Protocol

(56) References Cited

OTHER PUBLICATIONS

Specification (Release 7)", 3GPP TS 25.321 V7.5.0, Jun. 2007, 141 pages.
"3rd Generation Partnership Project; Technical Specification Group Radio Access Network; Medium Access Control (MAC) Protocol Specification (Release 7)", 3GPP TS 25.321 V7.7.0, Dec. 2007, 146 pages.
"3rd Generation Partnership Project; Technical Specification Group Radio Access Network; Medium Access Control (MAC) Protocol Specification (Release 8)", 3GPP TS 25.321 V8.0.0, Dec. 2007, 146 pages.
"3rd Generation Partnership Project; Technical Specification Group Radio Access Network; Radio Link Control (RLC) Protocol Specification (Release 7)", 3GPP TS 25.322 V7.2.0, Sep. 2006, 86 pages.
"3rd Generation Partnership Project; Technical Specification Group Radio Access Network; Radio Link Control (RLC) Protocol Specification (Release 7)", 3GPP TS 25.322 V7.5.0, Dec. 2007, 88 pages.
"3rd Generation Partnership Project; Technical Specification Group Radio Access Network; Radio Link Control (RLC) Protocol Specification (Release 8)", 3GPP TS 25.322 V8.0.0, Dec. 2007, 89 pages.
"3rd Generation Partnership Project; Technical Specification Group Radio Access Network; Radio Resource Control (RRC) Protocol Specification (Release 7)", 3GPP TS 25.331 V7.3.0, Dec. 2006, 1316 pages.
"3rd Generation Partnership Project; Technical Specification Group Radio Access Network; Radio Resource Control (RRC) Protocol Specification (Release 7)", 3GPP TS 25.331 V7.5.0, Jun. 2007, 1429 pages.
"3rd Generation Partnership Project; Technical Specification Group Radio Access Network; Radio Resource Control (RRC) Protocol Specification (Release 7)", 3GPP TS 25.331 V7.7.0, Dec. 2007, 1469 pages.
"3rd Generation Partnership Project; Technical Specification Group Radio Access Network; Radio Resource Control (RRC) Protocol Specification (Release 8)", 3GPP TS 25.331 V8.1.0, Dec. 2007, 1471 pages.
"Decision on Grant for Patent for Invention", Russian Patent Application No. 2009132930/07(046207), Oct. 28, 2011, 5 pages.
"Decision on Grant for Patent for Invention (Partial Translation)", Russian Patent Application No. 2009132930/07(046207), Oct. 28, 2011, 3 pages.
"Examination Notification", Taiwanese Patent Application No. 103113497, Oct. 28, 2015, 4 pages.
"Examination Notification (English Translation)", Taiwanese Patent Application No. 103113497, Oct. 28, 2015, 3 pages.
"International Search Report and Written Opinion", International Patent Application No. PCT/US2008/001398, Aug. 14, 2009, 30 pages.
"Japanese Notice of Allowance", Japanese Application No. 2014-113199, Jan. 20, 2015, 3 pages.
"Japanese Notice of Allowance (English Translation)", Japanese Application No. 2014-113199, Jan. 20, 2015, 3 pages.
"Japanese Official Notice of Rejection", Japanese Patent Application No. 2012-000238, Feb. 5, 2013, 2 pages.
"Japanese Official Notice of Rejection (English translation)", Japanese Patent Application No. 2012-000238, Feb. 5, 2013, 2 pages.
"Japanese Official Notice of Rejection", Japanese Application No. 2012-000238, Jan. 14, 2014, 2 pages.
"Japanese Official Notice of Rejection (English Translation)", Japanese Application No. 2012-000238, Jan. 14, 2014, 2 pages.
"Korean Office Action", Korean Patent Application No. 10-2012-7012558, Apr. 5, 2013, 4 pages.
"Korean Office Action (English Translation)", Korean Patent Application No. 10-2012-7012558, Apr. 5, 2013, 4 pages.
"Notification of Transmittal of International Preliminary Report on Patentability", PCT/US2008/001398, Aug. 14, 2009, 17 pages.
"Notification of Transmittal of International Report on Patentability", International Patent Application No. PCT/US2008/003336, Jun. 24, 2009, 18 pages.
"Notification of Transmittal of the International Search Report and Written Opinion", International Patent Application No. PCT/US2008/003336, Oct. 10, 2008, 18 pages.
"Official Decision of Grant", Russian Application No. 2009138222, Nov. 2, 2011, 9 pages.
"Official Decision of Grant (English translation)", Russian Application No. 2009138222, Nov. 2, 2011, 6 pages.
"Russian Office Action", Russian Patent Application No. 2009138222/09(054100), National Stage Application of PCT/US2008/003336, Mar. 17, 2011, 4 pages.
"Russian Office Action (Partial Translation)", Russian Patent Application No. 2009138222/09(054100), National Stage Application of PCT/US2008/003336, Mar. 17, 2011, 2 pages.
"Search Report and Written Opinion", Singapore Patent Application No. 200906119-3, National Stage of PCT Application No. PCT/US2008/003336, Sep. 29, 2010, 10 pages.
"Search Report and Written Opinion", Singapore Patent Application No. 200905104-6, Nov. 30, 2010, 12 pages.
"Taiwanese Office action", Taiwanese Application No. 097109226, Sep. 9, 2013, 7 Pages.
"Taiwanese Office Action (English Translation)", Taiwanese Application No. 097109226, Sep. 9, 2013, 4 Pages.
Ericsson, "Introducing flexible RLC PDU size in the uplink", 3GPP Tdoc R2-080788, Change Request TS 25.322 V8.0.0, 3GPP TSG-RAN2 Meeting #61, Sorrento, Italy, Feb. 11-15, 2008, 16 pages.
Ericsson, "Introduction of Improved L2 support for high data rates", 3GPP Tdoc R2-072307, Change Request TS 25.331, V7.4.0, 3GPP TSG-TAN WG2 Meeting #58, Kobe, Japan, May 7-11, 2007, 130 pages.
Ericsson, et al., "Introduction of Improved L2 support for high data rates and Enhanced CELL_FACH state", 3GPP Tdoc R2-072258, Change Request TS 25.321 V7.4.0, 3GPP TSG-RAN WG2 Meeting #58, Kobe, Japan, May 7-11, 2007, 39 pages.
Ericsson, "L2 Enhancements: Draft CR to RLC", 3GPP Tdoc R2-071198, Change Request TS 25.331, V7.3.0, 3GPP TSG-RAN WG2 Meeting #57bis, St. Julian's, Malta, Mar. 26-30, 2007, 17 pages.
Ericsson, "L2 Enhancements: Draft CR to RLC", 3GPP Tdoc R2-070034, Change Request TS 25.322 V7.2.0, 3GPP TSG-RAN2 Meeting #56bis, Sorento, Italy, Jan. 15-19, 2007, 56 pages.
Ericsson, "L2 Enhancements: Stage 2", 3GPP Tdoc R2-071077, Change Request TS 25.308 V7.1.0, 3GPP TSG-RAN2 Meeting #57, St. Louis, USA, Feb. 12-16, 2007, 21 pages.
Ericsson, "Proposed CR to TS 25.331 [Rel-7] on Introducing Enhanced L2 in RRC specification", 3GPP Tdoc R2-071063, Change Request 25.331 V7.3.0, 3GPP TSG-RAN2 Meeting #57, St. Louis, USA, Feb. 12-16, 2007, 8 pages.
ETSI, "Universal Mobile Telecommunications System (UMTS); Medium Access Control (MAC) Protocol Specification", 3GPP TS 25.321, V7.3.0, Release 7, vol. 3-R2, ETSI Standards, LIS, Sophia Antipolis Cedex, France, Dec. 2006, 113 pages.
ETSI, "Universal Mobile Telecommunications System (UMTS); Medium Access Control (MAC) Protocol Specification", 3GPP TS 25.321, V7.7.0, Release 7, vol. 3-R2, ETSI Standards, LIS, Sophia Antipolis Cedex, France, Jan. 2008, 151 pages.
ETSI, "Universal Mobile Telecommunications System (UMTS); Multiplexing and Channel Coding (FDD)", 3GPP TS 25.212 7.3.0, Release 7, Dec. 2006, 86 pages.
Interdigital, "Mobility and Interworking Between R6 and R7", 3GPP Tdoc R2-071186, 3GPP TSG-RAN WG2 Meeting #57bis, St. Julian's, Malta, Mar. 26-30, 2007, 3 pages.
Mazor, et al., "Dodeka-XXI", Radiotechnica, edition, Moscow, Publishing House, 2002, 2 Pages.
Nokia, "Summary of RAN2-56 Input to the HSPA+ TR", 3GPP Tdoc R2-063612, 3GPP TSG-RAN WG2 Meeting #56, Riga, Latvia, Nov. 6-10, 2006, 3 pages.
Polovinkina, et al., "Inform-systema", Technical art: theory, methodology, practice, edition, Moscow, NPO, 1995, 2 pages.
Siemens, "HSDPA Signalling Requirements for TDD Mode", 3GPP Tdoc R2-010715, 3GPP TSG-RAN Working Group2 meeting 19, Sophia Antipolis, Feb. 19-23, 2001, 7 pages.
U.S. Appl. No. 12/047,409, now U.S. Pat. No. 8,130,706 to Pani, et al., Mar. 6, 2012.

(56) References Cited

OTHER PUBLICATIONS

U.S. Appl. No. 13/397,513, now U.S. Pat. No. 8,705,406 to Pani, et al., Apr. 22, 2014.
U.S. Appl. No. 14/196,797, now U.S. Pat. No. 9,167,489 to Terry, et al., Oct. 20, 2015.
U.S. Appl. No. 14/856,400, filed Sep. 16, 2015.

* cited by examiner

METHOD AND APPARATUS FOR CONTROLLING A HANDOVER BETWEEN UTRA R6 CELLS AND R7 CELLS

CROSS REFERENCE TO RELATED APPLICATIONS

This application is a continuation of U.S. patent application Ser. No. 14/188,244, filed Feb. 24, 2014; which is a continuation of U.S. patent application Ser. No. 13/216,564, filed Aug. 24, 2011, now U.S. Pat. No. 8,705,489; which is a continuation of U.S. patent application Ser. No. 12/024,539, filed Feb. 1, 2008, now U.S. Pat. No. 8,320,327; which claims the benefit of U.S. Provisional Application No. 60/887,896, filed Feb. 2, 2007; U.S. Provisional Application No. 60/895,338, filed Mar. 16, 2007; U.S. Provisional Application No. 60/908,076, filed Mar. 26, 2007; and U.S. Provisional Application No. 60/914,189, filed Apr. 26, 2007 . Each of the foregoing applications is incorporated by reference herein as if fully set forth.

FIELD OF INVENTION

This application is related to wireless communications.

BACKGROUND

Some of the major goals of high speed packet access (HSPA) evolution include higher data rates, higher system capacity and coverage, enhanced support for packet services, reduced latency, reduced operator costs and backward compatibility. Meeting these goals requires evolutions to the radio interface protocol and network architecture. More specifically, meeting these goals has required a set of enhancements and architecture changes to layer 2 (L2), (i.e., radio link control (RLC) and medium access control (MAC)), functionalities.

Some of the L2 enhancements include flexible RLC protocol data unit (PDU) sizes, high speed MAC (MAC-hs) segmentation/concatenation and multiplexing. In universal terrestrial radio access (UTRA) Release 6 (R6), the acknowledge mode (AM) RLC entities can only use a fixed RLC PDU size. In addition, the MAC-hs sub-layer in the Node-B can only support concatenation of MAC-d PDUs. The L2 enhancements of UTRA Release 7 (R7) result in significant RLC/MAC changes of R6 features.

The changes to the enhanced MAC-hs (MAC-ehs) architecture on the UTRAN side include the addition of a logical channel identifier (LCH-ID) multiplexing (MUX) entity. The LCH-ID MUX entity multiplexes logical channels into a priority queue. The MAC-ehs architecture further includes priority queue segmentation functionality and multiplexing MAC-ehs payload units from different priority queues into a MAC-ehs PDU.

The changes to the MAC-ehs architecture on the wireless transmit/receive unit (WTRU) side include disassembly of the MAC-ehs payload units from the MAC-ehs PDU. Further, after re-ordering, the MAC-ehs payload units are forwarded to a LCH-ID demultiplexing entity. This LCH-ID demultiplexing entity routes the MAC-ehs payload units to the correct reassembly entity based on the logical channel identifier. The MAC-ehs architecture at the WTRU also includes a reassembly entity that reassembles segmented MAC-ehs service data units (SDUs) and forwards full MAC-ehs SDUs to the higher layers.

Currently, when radio bearers are setup or reconfigured via radio resource control (RRC) signaling, the information element (IE) "radio bearer (RB) mapping info" is present. The ""RB mapping info" contains information about the RLC instance and transport channels corresponding to the radio bearer (RB).

New information elements (IE)s may be added to the IE "RB mapping info", that indicate whether the logical channel of an RLC instance supports flexible RLC PDUs, or whether the MAC sub-layers supports MAC-hs or MAC-ehs. For the purpose of this invention we will call these IEs "downlink (DL) RLC configuration" and "DL MAC-hs configuration". The MAC-hs configuration has to be the same across all RBs mapped to a high speed-downlink shared channel (HS-DSCH), otherwise an invalid configuration will result.

In HSPA, the high speed shared channels are monitored by a WTRU in a single cell, (i.e., the serving high speed downlink shared channel (HS-DSCH) cell). Due to mobility, when the WTRU is moving from one cell to the other, the WTRU needs to perform a serving cell change by switching to a new serving HS-DSCH cell and terminating communication with the old serving HS-DSCH cell. In a Node-B relocation procedure, an inter-Node-B handover occurs from an old Node-B (i.e., a source Node-B) to a new Node-B (i.e., a target Node-B).

At the time of a serving Node-B change, the target Node-B needs to start transmission of data over the new configuration. The handover can occur within evolved HSPA Node-Bs which support the L2 enhancements, or to/from cells with or without L2 enhancements. For both cases, the WTRU must be able to perform a handover, adjust to the new configurations, and minimize data loss.

In a conventional system, (i.e., R6 system), when a handover occurs, a radio resource control (RRC) message can carry a MAC layer reset indicator. Specifically, when an inter-Node-B or intra-Node-B handover occurs, the data in the MAC-hs in the source Node-B is deleted, and the MAC-hs in the WTRU has to be reset. Upon reception of the reset indicator, the WTRU will perform the following sequence of functions:

1) flush a hybrid automatic repeat request (HARQ) soft buffer for all configured HARQ processes;
2) stop all active re-ordering release timer (T1) and set all timer T1 to their initial value;
3) start transmission sequence number (TSN) with a value 0 for the next transmission on every configured HARQ process;
4) initialize variables RcvWindow_UpperEdge and next_expected_TSN to their initial values;
5) disassemble all MAC-hs PDUs in the re-ordering buffer and deliver all MAC-d PDUs to the MAC-d entity; and
6) flush the re-ordering buffer.

With the introduction of new L2 enhancements, new procedures need to be defined in order to optimize and minimize data loss during a handover between R7 cells, or between an R7 cell and an R6 cell. Specifically, procedures that deal with resetting of the MAC-hs entity need to be modified in order to account for the new L2 enhancements.

In addition, it cannot be assumed that all of the R6 Node-Bs will be upgraded at the same time to R7 Node-Bs. Therefore, handovers between R6 and R7 cells may frequently occur. Due to the functional changes of the RLC and MAC, methods to perform handovers with minimal loss of quality and data between these cells must be defined. Specifically, on the WTRU side, the MAC-hs and the RLC must perform functional changes during the handovers.

SUMMARY

A method and apparatus for controlling an optimization of handover procedures between UTRA R6 (i.e., lower layer) cells and UTRA R7 (i.e., higher layer) cells are disclosed. When a WTRU is moving between an R6 cell and an R7 cell, or between R7 cells, a handover is initiated, from a source Node-B to a target Node-B. In the R7 cell, the enhanced MAC functionality including flexible RLC PDU size and MAC-hs segmentation, and multiplexing of different priority queues in the WTRU, are supported. The changes that occur in the WRTU are due to the fact that the WRTU is moving between R6 and R7 cells. When the WRTU moves between such cells, the network has to reconfigure the WRTU with the new configurations. After the handover, a MAC layer and/or an RLC layer are reconfigured or reset based on functionality supported by the target Node-B.

BRIEF DESCRIPTION OF THE DRAWINGS

A more detailed understanding of the invention may be had from the following description in conjunction with the accompanying drawings wherein.

DETAILED DESCRIPTION

When referred to hereafter, the terminology wireless transmit/receive unit (WTRU) includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "Node-B" includes but is not limited to a base station, a site controller, an access point (AP), or any other type of interfacing device capable of operating in a wireless environment.

When referred to hereafter, an R7 cell includes Node-Bs and RNCs that have the improved L2 features. Throughout this invention a R7 cell can refer to higher releases that support improved L2 . When referred hereafter, an R6 cell includes Node-B and RNC that do not support improved L2 features. This may include R7 Node-Bs without the L2 features and any of the previous third generation partnership project (3GPP) releases. The R7 MAC-hs in this invention refers to the enhanced MAC-hs (i.e. MAC-ehs).

The terminology RLC reset also refers to a RLC re-establishment. These terms are used interchangeably.

The following terms are used throughout the description and are briefly defined. A MAC-ehs payload unit is a MAC-ehs SDU or segment of a MAC-ehs SDU contained in a MAC-ehs DPU. A MAC-ehs re-ordering PDU is a set of MAC-ehs payload units in a MAC-ehs PDU that belongs to a same priority queue. An enhanced cell is a cell that supports L2 enhancements. A non-enhanced cell is a cell that does not support L2 enhancements.

Changes to the MAC-hs or MAC-ehs reset procedure, a MAC-hs or MAC-ehs reconfiguration procedure and RLC re-establishment evaluation procedures are disclosed.

A method and apparatus are disclosed herein that deals with the optimization of handover scenarios, resetting procedures of the MAC-hs and RLC entities for supporting handovers between R7 cells, and between R6 and R7 cells. It should be understood that references to R6 cells or R6 Node-Bs are directed to cells and Node-Bs that do not support improved L2 features, such as MAC segmentation and flexible RLC PDU size. The disclosed method and apparatus are applicable to both uplink (UL) and downlink (DL), as well as to other wireless technologies such as long term evolution (LTE) and other flat architecture systems such as R8 wideband code division multiple access (WCDMA).

Figure 1A:
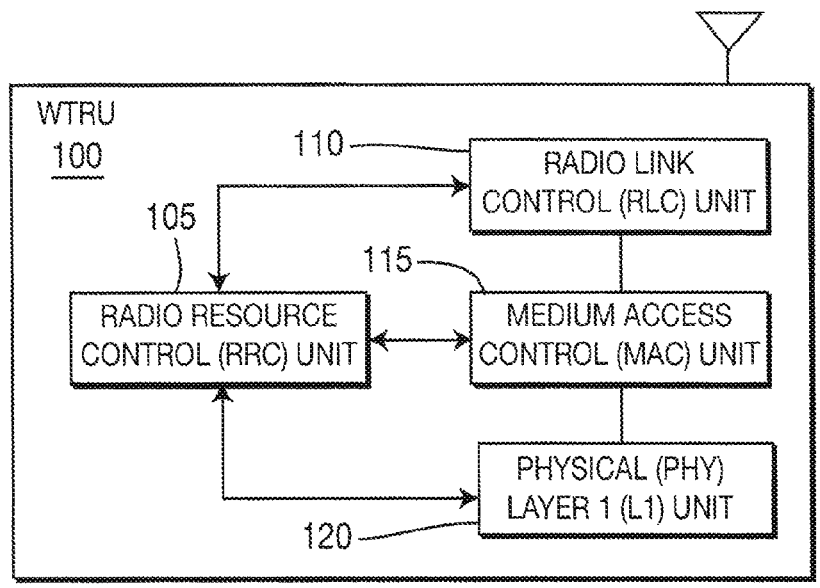
FIG. 1A is an exemplary block diagram of a WTRU that moves between R6 and R7 cells, and is configured to operate with the new RLC and MAC-hs sub-layers when a handover message is received during a serving cell change procedure.

FIG. 1A is an exemplary block diagram of a WTRU 100 that moves between R6 and R7 cells, and is configured to operate with the new RLC and MAC-hs sub-layers when a handover message is received during a serving cell change procedure. As shown in FIG. 1A, the WTRU 100 includes an RRC unit 105, an RLC unit 10, a MAC unit 115 and a physical (PRY) layer 1 unit 120. The serving cell change may occur via a radio bearer reconfiguration RRC message, a transport channel reconfiguration RRC message or a physical channel reconfiguration RRC message.

The WTRU 100 operates in a wireless communication system including a target Node-B, a source Node-B, a controlling RNC (CRNC) and a source RNC (SRNC) (not shown). The SRNC may include an RLC unit and an RRC unit (not shown).

Intra-R7 Cell Handover

In R7 architecture, the MAC-hs comprises new functionalities which include MAC-hs segmentation and multiplexing of different priority queues in the Node-B. The RLC functionality remains in a radio network controller (RNC) and supports flexible PDU sizes. The R7 MAC-hs header is significantly different from the R6 MAC-hs header. In LTE and other WCDMA flat architecture systems, the RLC functionality is in the Node-B. In the UL, the RLC functionality is located in the WTRU.

When a handover takes place, the MAC-hs entity in a source Node-B is deleted and a new MAC-hs entity is set up in a target Node-B. When the new configuration takes place, the maximum RLC PDU size may be adjusted for the target Node-B. This is done by one or a combination of the following methods: 1) assign a default value for initial RLC PDU size; 2) keep the existing RLC PDU size; or 3) set a new RLC PDU size based on channel conditions of the target Node-B. This is applicable in the case the Node-B signals the maximum RLC PDU size to the RLC entity in the RNC. Channel quality indicator (CQI) reports that are sent to the target Node-B during handover may offer a good estimate of channel conditions. In turn, the target Node-B may provide feedback to the RLC entity in the RNC to set an updated RLC PDU size prior to initiating transmission over the new cell. Any conventional methods may be used to provide feedback information to the target Node-B during a serving HS-DSCH cell change.

When a new MAC-hs is setup in the target Node-B, the MAC-hs on the WTRU side is preferably synchronized with the target Node-B. Therefore, the WTRU preferably also resets the MAC-hs entity in the WTRU.

Due to the functionality changes of the MAC-hs sub-layer, the R6 reset procedure is modified to account for the fact that after HARQ reception a MAC-hs PDU disassembly function is used before re-ordering. After re-ordering, a re-assembly function is added to the existing disassembly function.

The conventional R6 MAC-hs reset procedure is changed by disassembling all of the MAC-hs PDUs in the re-ordering buffer, reassembling the segmented packets that can be successfully reassembled into MAC-hs service data units (SDUs), delivering all complete MAC-hs SDUs to higher layers, and discarding partially received MAC-hs SDUs.

More specifically, due to changes in the architecture, it is proposed to update the MAC-ehs reset procedure. At a given activation time or at the time of indication, the WTRU must process the MAC-ehs re-ordering PDUs waiting in the re-ordering buffer. All MAC-ehs re-ordering PDUs must be disassembled or demultiplexed into MAC-ehs payload units. The MAC-ehs payload units are then passed to a reassembly unit. After the reassembly entity processes all MAC-ehs payload units and reassembles the segmented MAC-ehs payload units into MAC-ehs SDUs that can be reassembled, the reassembly entity must ensure that any remaining stored MAC-hs SDU segment(s) are deleted from the reassembly entity. Finally complete PDUs are delivered to higher layers in the corresponding logical channels or MAC-d/c flows.

For example, the MAC-ehs reset procedure may take the following form for the MAC-ehs architecture. if a reset of the MAC unit 115 is requested by upper layers, the WTRU 100 shall at the activation time indicated by higher layers:
  a) flush the HARQ soft buffers for all configured HARQ processes;
  b) stop all active re-ordering release timers (T1) and set all timers T1 to their initial value;
  c) start TSN with value 0 for the next transmission on every configured HARQ process (and every priority queue);
  d) initialize the variables RcvWindow_UpperEdge and next_expected_TSN to their initial values;
  e) deliver all re-ordering PDUs in a re-ordering queue to LCH-ID demultiplexing units and/or demultiplex MAC-ehs payload units and route them to the correct reassembly unit based on the logical channel identifier;
  f) perform reassembly of segmented MAC-ehs SDUs and deliver complete MAC-ehs SDUs (MAC PDUs) to higher layers;
  g) discard any stored re-ordering PDUs (or MAC-hs SDU segments) from the reassembly units;
  h) flush the re-ordering queues; and
  i) optionally indicate to all acknowledge mode (AM) RLC entities mapped on HS-DSCH to generate a status report if the MAC-hs reset was initiated due to reception of the IE "MAC-hs reset indicator" by the upper layers.

A different MAC-ehs architecture may exist where the re-ordering functionality is followed by an SDU disassembly function, reassembly entity, and finally a LCH-ID demultiplexing entity. The disassembly function may be part of the reassembly entity in which case only a reassembly entity will exist in the MAC-ehs architecture. For example, the MAC-ehs reset procedure may take the following form for this MAC-ehs architecture.

Figure 1B:
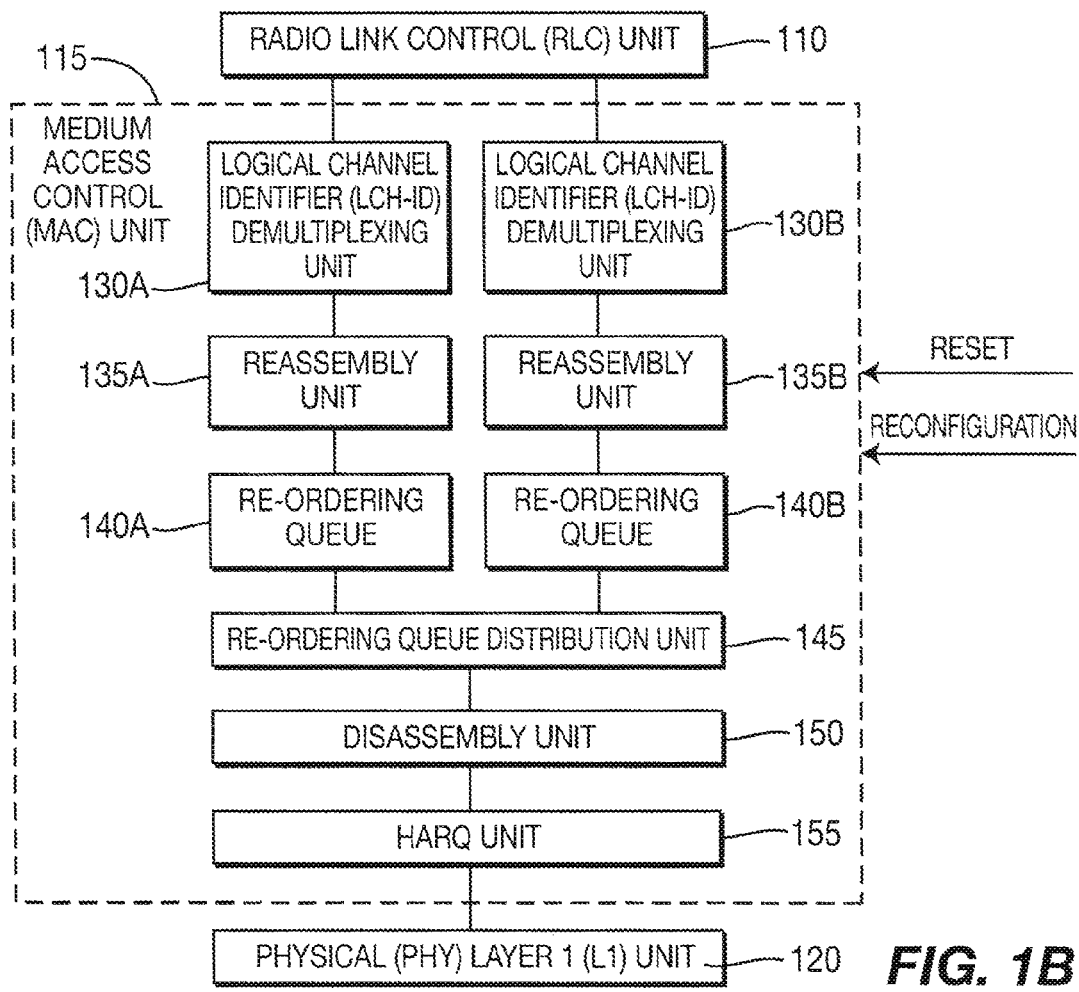
FIG. 1B is a detailed diagram of a MAC unit in the WTRU of FIG. 1A.

FIG. 1B is a detailed diagram of the MAC unit 115 in the WTRU 100 of FIG. 1A. As shown in FIG. 1B, the MAC unit 115 includes a plurality of LCH-ID demultiplexing units 130A and 130B, reassembly units 135A and 135B, re-ordering queues 140A and 140B, a re-ordering queue distribution unit 145, a disassembly unit 150 and an HARQ unit 155. The re-ordering queues 140A and 140B are used to perform re-ordering of received MAC-ehs PDUs, such that reassembly can be performed and data can be delivered in order to higher layers. The HARQ unit 155 includes at least one HARQ soft buffer (not shown).

Referring to FIG. 1B, if a reset of the MAC-ehs entity is requested by upper layers, the WTRU 100 shall at the activation time indicated by higher layers:
  a) flush the HARQ soft buffer in the HARQ unit 155 for all configured HARQ processes;
  b) stop all active re-ordering release timers (T1) and set all timers T1 to their initial values;
  c) start TSN with value 0 for the next transmission on every configured HARQ process (and every priority queue);
  d) initialize the variables RcvWindow_UpperEdge and next_expected_TSN to their initial values;
  e) all reordering PDUs in the re-ordering queues 140A and 140B are delivered to the disassembly unit 150, and/or;
  f) the disassembly unit 150 disassembles all re-ordering PDUs into MAC-hs SDUs or segments of MAC-hs SDUs and delivers them to the reassembly units 135A and 135B or;
  g) if only a reassembly unit 135 exists, data from the re-ordering queues are delivered to the reassembly unit 135. The reassembly units 135A and 135B perform reassembly of segmented MAC-ehs SDUs and deliver complete MAC-ehs SDUs to the LCH-ID demultiplexing units 130A and 130B, each of which deliver the complete SDUs to the correct logical channel or MAC-d/c flow;
  h) discard any stored re-ordering PDUs (or MAC-hs SDU segments) from the reassembly units 135A and 135B; and
  i) flush the re-ordering queues 140A and 140B.

Optionally, in the case of intra-Node-B handover, (i.e., handover between sectors of the same Node-B), the MAC-hs reset procedure described above may not have to be carried out.) In this case, the handover is carried out as described in the conventional R6 system.

Handovers Between R6 and R7 Cells

L2 enhanced cells, (i.e., R7 cells), support flexible RLC PDU size while non-enhanced cells, (i.e., R6 cells), have a fixed RLC PDU size. This implies that when a handover to and from R7 cells occurs, the affected RLC entities in the RNC and the WTRU have to be reconfigured to the old RLC entities. In addition, the MAC-hs sub-layers need to be re-configured to decode the correct header formats and support the new or old functionalities.

If a re-establishment of the RLC entity is required, a significant loss of data may occur. Thus, it would be desirable to minimize this data loss.

Sequence of Events for Handover Procedure

Figure 2:
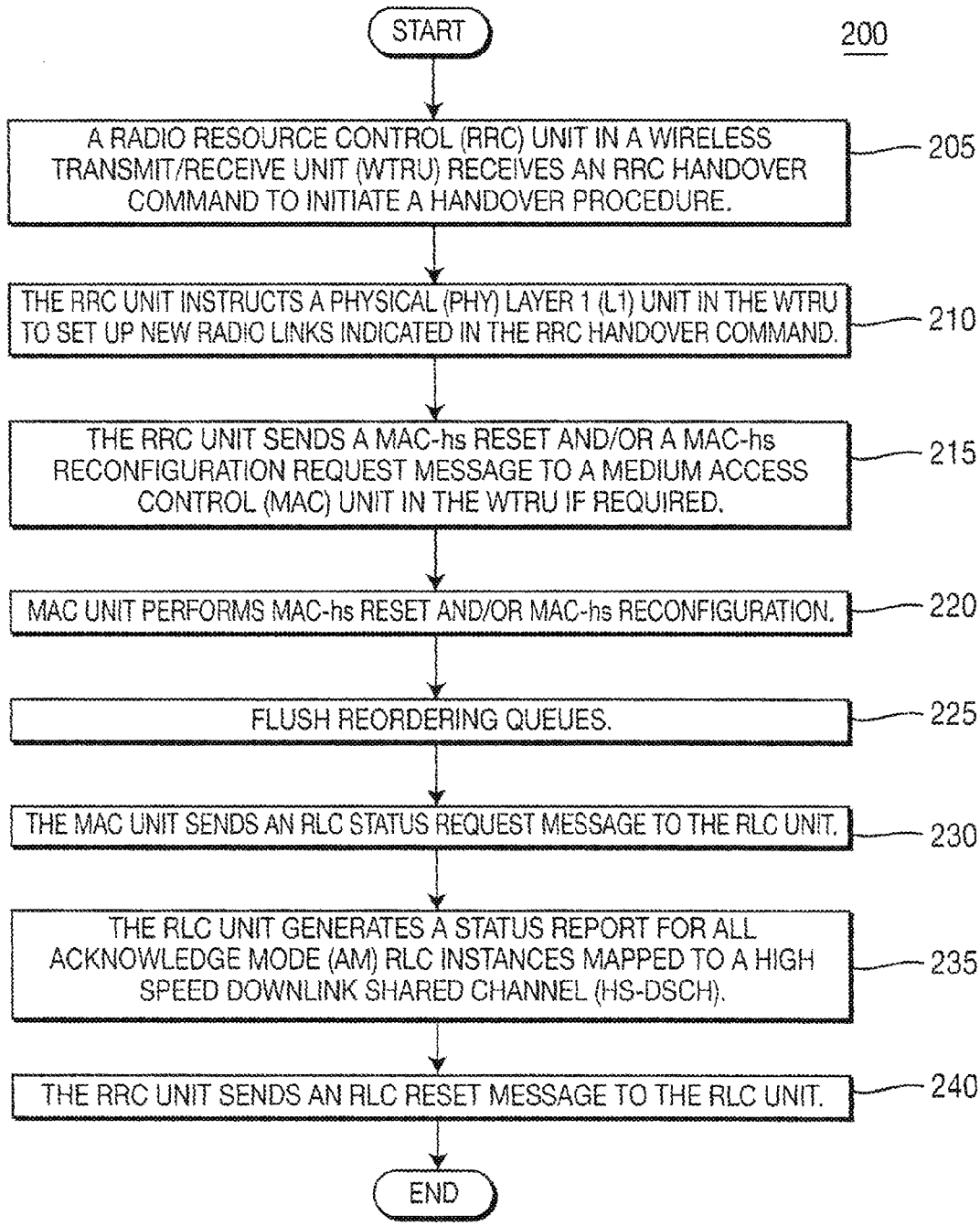
FIG. 2 is a flow diagram of a WTRU handover procedure implemented in the WTRU of FIG. 1A.

FIG. 2 is a flow diagram of a WTRU handover procedure 200 implemented in the WTRU 100 of FIG. 1. In step 205, the RRC unit 105 in the WTRU 100 receives an RRC handover command to initiate a handover procedure. In step 210, the physical (PHY) layer 1 (L1) unit 120 is instructed by the RRC unit 105 to set up new radio links indicated in the RRC handover command. This sequence of events is similar to the conventional procedure up to the MAC-hs reset step.

In step 215, the RRC unit 105 sends a MAC-hs reset and/or a MAC-hs reconfiguration request to the MAC unit 115 in the WTRU 100, as required. If a MAC-hs reconfiguration is required, then a MAC-hs reconfiguration is performed as explained in detail below. The MAC-hs reset indicator parameter of the RRC unit 105 to MAC primitive may optionally be extended to indicate MAC-hs reconfiguration.

Once the MAC unit 115 performs the MAC-hs reset and/or MAC-hs reconfiguration (step 220), and the re-ordering queues 140A and 140B in the MAC unit 115 are flushed (step 225), an RLC status request message may be sent to the RLC unit 110 from the MAC unit 115 (step 230). In step 235, the RLC unit 110 then generates a status report for all acknowledge mode (AM) RLC instances mapped to the HS-DSCH after each of the RLC PDUs have been processed by the RLC unit 110. Optionally, no RLC status request message is sent to the RLC unit 110.

If an RLC reset is required, the RHO unit 105 sends a re-establishment request message (i.e., RLC reset message) to the RLC unit 110 (step 240). A partial or full RLC reset is then performed as a result of this request as described in detail below. The following options may be available for an RLC reset indication:

1) No RLC indication is sent to the RLC unit 110;
2) A full reset indication is sent to the RLC unit 110; or
3) A partial reset indication is sent to the RLC unit 110.

The RLC reset/reconfiguration indication may be signaled by the control RLC (CRLC)-Config-Req primitive, or may be explicitly signaled by the MAC-hs with the last forwarded MAC SDU. Alternatively, the RLC reset/reconfiguration indication may be signaled by the MAC-hs with the STATUS-Report-Req. RLC processing of all flushed SDUs is preferably performed before the status report or RLC reset.

If an unsynchronized handover is performed, steps 220-230 are performed as soon as the RRC message is received. If a synchronized handover is performed, the steps 220-230 are performed at the given activation time.

Signaling Method to the WTRU

Once the RRC in the RNC has made a decision to perform a serving Node-B change, the RNC must notify the WTRU that a reset/reconfiguration for the MAC-hs sub-layer or receiving RLC entity, if applicable, is required. One or a combination of the following options are preferably performed:

The RNC sends an RRC handover message explicitly indicating one or a combination of the following information:

1a) MAC-hs reset or reconfiguration. An extra bit, (i.e., MAC-hs reconfiguration indicator), is added to the RRC message indicating either the R6 or R7 MAC-hs operation following handover.

1b) RLC reset indicator to specify either partial or full reset.

1c) Two bits to indicate one of:
i) MAC-hs reset;
ii) MAC-hs reconfiguration;
iii) RLC reset; or
iv) no action required.

1d) Extra field indicating that a change of cell from R6 to R7 or vice versa has occurred; or 1e) No extra information is added to the RRC handover message except the conventional MAC-hs reset indicator.

The WTRU preferably decides what action it must take based on one or a combination of the following options:

2a) If MAC-hs reconfiguration or RLC reset is signaled explicitly, (i.e., signaling 1a, 1b or 1c above), the WTRU performs the indicated tasks in the order described above.

2b) If only MAC-hs reset is set to TRUE and no extra information bits are added to the RRC handover message, (i.e., signaling 1e), then the WTRU bases its decision on system information from the source and target cell from the RRC messages. Specifically, the WTRU implicitly reads/obtains information on the features the source and target cell support.

i) If the WTRU detects that a change from R6 to R7 or from R7 to R6 is occurring, the WTRU deduces that a MAC-hs reconfiguration is necessary. In addition, the WTRU may also deduce whether an RLC reset or re-establishment is required. The WRTU may deduct that a change from R6 to R7 or vice versa occurred via the information provided in the IE "RB mapping info" in the RRC handover message, i.e. whether MAC-ehs or MAC-hs is being configured and whether the new RLC entity supports flexible or fixed RLC PDUs. The WRTU compares the new configuration with the existing one and deducts that a change has occurred.

ii) RLC reset may not be necessary when a change from R6 to R7 occurs. This information can be configured by higher layers. Higher layers may indicate that no RLC reset or full/partial RLC reset is required between certain releases.

2c) If only MAC-hs reconfiguration indicator is added to the RRC message, (i.e., signaling 1a above), the WTRU may deduce that an RLC reset is also required.

2d) Alternatively, if only RLC reset indicator is added to the RRC message, (i.e., signaling 1b above), the WTRU deduces that a MAC-hs reconfiguration is required.

2e) If MAC-hs reset indicator is set to true and the extra field in the RRC message indicates that the source and target cells support different releases, (i.e., signaling 1d above), then the WTRU decides whether MAC-hs reconfiguration is required and/or RLC partial or full reset is required.

Methods to Perform a MAC-hs Reconfiguration

The MAC-hs reconfiguration performs a change of MAC-hs functionality from the old MAC-hs to the new MAC-hs. Specifically, if a WTRU is moving between R6 and R7 cells, the header format and functionality of the MAC-hs is changed. Therefore, a method to perform this change is required.

Initially, the MAC-hs reset procedure is performed. Once the buffers are cleared, variables are reset, and successful MAC-hs SDUs are delivered to higher layers, the MAC layer reconfigures its functionality.

If a change from R6 to R7 occurs, the following sequence of events may take place:

1) MAC-hs reset is performed.
2) Following reset of HARQ processes, the MAC layer is configured to support MAC-ehs header format.
3) Demultiplexing of priority queues functionality is added prior to the re-ordering queues. Optionally, the demultiplexing functionality may always be present when the MAC-hs is setup, (given the WTRU supports R7), since in R6 cells only one re-ordering queue is present in each MAC-hs PDU.
4) Reassembly (and demultiplexing of logical channels) functionality is added to the existing de-assembly functional block in each re-ordering queue. Optionally, the re-assembly functionality may always be present when the MAC-hs is setup, (given the WTRU supports R7), since in R6 cells no entries in the re-ordering queue will have segmentation identifiers.

If a change from R7 to R6 occurs, the following sequence of events may take place:

1) MAC-ehs reset as defined for UTRA R7 cells is performed.
2) Following reset of HARQ processes, MAC-hs is configured to support R6 header format.

3) Demultiplexing of priority queues functionality is removed. Optionally, the demultiplexing functionality is kept in MAC-hs since in R6 cells only one re-ordering queue will be present in each MAC-hs PDU.

4) Re-assembly functionality is removed. Optionally, the reassembly remains inactive in the MAC-hs since in R6 cells no entries in the re-ordering queue will have segmentation identifiers.

MAC-hs Reconfiguration Procedure

A single MAC-ehs or MAC-hs instance per WTRU should be configured for all radio bearers. Therefore, the MAC-hs is configured to support an enhanced configuration in cell supporting Release 7 or higher and a normal configuration in a cell supporting Release 6 or lower.

A WTRU may change its MAC-hs configuration from an enhanced configuration to a normal configuration or vice versa if ordered by higher layers. This may happen, for instance, during a handover scenario. A procedure that deals with the reconfiguration of the MAC-hs between MAC-hs and MAC-ehs is described below.

The reconfiguration procedure relies on the information provided to the WTRU via RRC messages that contain IEs on the MAC-hs or MAC-ehs configurations, or its equivalent IE included in the "RB mapping info" IE and the IE is present when a RB is setup or reconfigured.

The reconfiguration procedure may take place in: the description of generic actions upon receipt of "RB mapping info" IE; a new definition that deals with actions on receipt of the "DL MAC-hs configuration" IE or its equivalent IE; or another existing action that deals with another configuration of the MAC.

The procedure corresponding to the reception of this IE may be defined as follows:

a) If "DL MAC-hs configuration" is set to the value "enhanced" and the previously stored value was set to "normal" (i.e., if the configuration is changing from normal to enhanced):

1) reset the MAC-hs entity; and
2) configure the MAC-hs or MAC-ehs according to the IE "DL MAC-hs configuration".

b) Else, if "DL MAC-hs configuration" is set; to the value "normal" and the previously stored value was set to "enhanced" (i.e., if the configuration is changing from enhanced to normal):

1) reset the MAC-ehs entity; and
2) configure the MAC-hs or MAC-ehs according to the IE "DL MAC-hs configuration."

In an optional embodiment, if the MAC-hs reconfiguration is performed at the time of handover, the existing MAC-hs reset indication may simultaneously be used with a change of configuration. However, the procedure must ensure that the MAC-hs reset indicator is read and performed prior to reconfiguring the MAC-hs. In this embodiment, an optional check may be performed. If a MAC-hs reconfiguration occurs, and the MAC-hs reset indicator is not set, then the WTRU behavior may be unspecified or the MAC independently performs a reset.

Optionally, the MAC reconfiguration from normal to enhanced or vice versa can be specified in the MAC (3GPP 25.321) specifications. The steps can be specified as part of the existing MAC-hs or MAC-ehs procedure. More specifically, when a MAC-hs or MAC-ehs reset is requested by upper layers due to reconfiguration from normal to enhanced MAC-hs or vice versa, the following shall/can be clarified in the MAC-hs and/or MAC-ehs reset procedure. If a reconfiguration has occurred, (or optionally it can apply to all cases), all flushed re-ordering PDUs or MAC-hs PDUs must be processed using the old configuration existing prior to the reset indication.

Alternatively, the reconfiguration procedure can be specified in a new section in the MAC specification (3GPP 25.321) or as part of the reconfiguration of MAC-hs/MAC-ehs parameters procedure. The method deals specifically, with the reconfiguration of the MAC-hs to MAC-ehs or vice versa ordered by higher layers. More specifically, the following may be specified and indicated:

MAC-hs/ehs entity may be reconfigured (modified) by upper layers from normal to enhanced or vice versa.

When the MAC-hs/ehs entity is reconfigured by the upper layers, the WTRU shall reset the MAC-hs/ehs entity (all packets in the re-ordering queues must be processed using the old configuration prior to reconfiguration).

Alternatively for the purpose of this procedure, the reset may be substituted, by removing all re-ordering PDUs or MAC-hs PDUs from the re-ordering queue and deliver them to the output entity, where the output entity is the entity above the re-ordering entity (for example, for MAC-hs it can be the disassembly entity and for MAC-ehs it can be the LCH-ID demultiplexing entity, or reassembly entity). Note that the reset procedure may still be carried out after the reconfiguration due to the explicit MAC-hs reset indicator in the handover command. Then use of the new MAC-hs or MAC-ehs configuration starts at the activation time indicated by higher layers.

Methods to Perform RLC Reset During Handovers a) Switching from R6 to R7 cells without full RLC reset.

When switching from R6 to R7 cells, a full reset may not be performed due to the fact that the new RLC may be configured to support flexible PDU sizes. This is called a partial reset. If the RLC headers do not have any significant changes, the existing fixed RLC PDUs are preferably treated as flexible PDUs in the new RLC. Therefore, the RLC entity preferably maintains the existing sequence numbers and corresponding RLC PDUs. However, some variables are preferably re-initialized or changed to support the new RLC entities. These variables preferably include, but not limited to, one or a combination of timers, variables that deal with the maintenance of receive and transmit window, criteria for status reporting, and other status variables applicable to R7.

If a reset is required, a method similar to the one below may be performed.

b) Switching from R7 to R6 cells when RLC reset is required.

A change of serving cell from an R7 cell to an R6 cell may require an RLC reset due to the fact that the R6 RLC is not configured to deal with flexible RLC PDU sizes Therefore, the RLC PDUs in the RLC entity are preferably deleted in the transmit side and processed in the receive side before the reset is applied. In order to optimize the reset procedure and minimize data loss, one of the following two options is preferably performed. Additionally, in other systems where the RLC functionality is included in the Node-B, such as LTE or flat architecture R8 WCDMA, when an inter-Node-B handover occurs, the RLC entity in the WRTU may have to be reset or re-established and data loss has to be minimized. The options described below are also applicable to such systems.

Option 1

The transmit side resets state variables specified for the sender. The transmit side sets configurable parameters applicable to the transmit side of the new RLC entity. The transmit side resets hyper frame number (HFN). The transmit side discards SDUs that have been successfully transmitted to the receiver for each AM RLC entity, (i.e., all the RLC PDUs corresponding to the SDUs that have been positively acknowledged and alternatively notifies higher layers that these SDUs have been successfully transmitted).

Alternatively, the transmit side may discard all that have been successfully transmitted up to the first unsuccessful SDU. All SDUs that have one or more non-acknowledged RLC PDUs are saved in the transmission buffer, where the transmission buffer may be located in the RLC entity or in higher layers, such as the packet data convergence protocol (PDCP). The transmit side discards all RLC PDUs and all control PDUs in the transmit side. Once the reset procedure is completed, the RLC SDUs that were not discarded may be transmitted via the target Node-B over the new RLC configuration in the target Node-B.

This method minimizes data loss and the unsuccessful SDUs are retransmitted. Since the transmit side did not receive a final status PDU from the receive side, the transmit side does not have up-to-date status information. This can result in duplicate transmission of RLC SDUs. Therefore, duplicate detection functionality may be added on the receive side.

Optionally, a method can be implemented to get a final status information from the receive side prior to resetting the RLC. The receive side, after resetting and/or reconfiguring the MAC-hs, triggers a status report for all AM RLC entities mapped to HS-DSCH. The status reports are RLC PDU based. However, the transmit side must wait to receive the RLC PDU status prior to resetting the RLC. This may delay the handover procedure.

Alternatively, the receive side may transmit RLC SDU status to the transmit side. The transmit side may then discard any other RLC SDUs that have been successfully received. This can minimize duplicate transmission. However, a method to identify the RLC SDUs (numbering of RLC SDUs) is needed. Optionally, this function may be performed by a packet data convergence protocol (PDCP) layer instead of the RLC layer. If the data recovery process is handled by the PDCP the equivalent of a RLC SDU is a PDCP SDU. As mentioned above, the transmitter side will use the status report to retransmit SDUs that have not been successfully received and discard the SDUs that are indicated as successfully received by the status report, either at the RLC level or PDCP level.

At the receive side, after MAC has been reset and all successfully received packets including all packets in the re-ordering queues are delivered to the RLC, the following steps may take place. The receive side processes all RLC PDUs. Optionally, the receive side generates RLC status reports for each RLC AM instance if used to minimize data loss. The receive side sends RLC PDUs that can be successfully assembled into RLC SDUs to higher layers. The receive side discards RLC PDUs that cannot be assembled into RLC SDUs. Optionally, if in-sequence delivery is supported, RLC SDUs that are not in sequence may be preserved in the receive side, since the missing SDUs will be re-transmitted from the target Node-B. Optionally, this could be performed in the PDCP layer. More specifically, if this functionality is performed in the PDCP the procedure just described above would be replaced by PDCP SDU. More specifically, the PDCP would store PDCP SDUs that are not in sequence until the missing SDUs are retransmitted from the target Node-B. The RLC layer may then be reconfigured to the new RLC configuration while resetting state variables and setting configurable parameters applicable to the receiving side to the default values. Duplicate detection functionality may be added. Duplicate RLC SDUs may be deleted and not transmitted to higher layers. This step may optionally be performed by higher layers.

Option 2

In accordance with option 2, the RLC reset may be avoided. Specifically, if the RLC PDU size from an R7 cell is larger that the fixed RLC PDU size of an R6 cell and a WTRU is moving from the R6 cell to the R7 cell, a smaller size PLC PDU is preferably transmitted and allowed in the R7 cell. If the RLC PDU size from an R7 cell is larger that the fixed RLC PDU size of an R6 cell and a WTRU is moving from the R7 cell to the R6 cell, all the RLC PDUs from the R7 cell are preferably re-segmented into the fixed RLC PDU size. This requires an RLC re-segmentation functionality. All other variables and parameters applicable to the receive and transmit sides of the new RLC entities are preferably set to support R6 RLC.

Although the features and elements are described in particular combinations, each feature or element can be used alone without the other features and elements or in various combinations with or without other features and elements. The methods or flow charts provided may be implemented in a computer program, software, or firmware tangibly embodied in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) module.

What is claimed is:

1. A method of resetting a medium access control (MAC) unit, the method comprising:
   receiving, from a radio resource control (RRC) unit, an enhanced high speed MAC (MAC-ehs) reset request;
   flushing a hybrid automatic repeat request (HARQ) soft buffer in the MAC unit for all configured HARQ processes;
   stopping a re-ordering release timer and a MAC-ehs re-ordering timer;
   performing a re-ordering of received MAC-ehs protocol data units (PDUs) using at least one variable;
   setting the timers and the variable to their initial values;

delivering all re-ordering PDUs in a re-ordering queue of the MAC unit to a reassembly unit located in the MAC unit;
performing reassembly of segmented MAC-ehs service data units (SDUs);
delivering successfully reassembled MAC-ehs SDUs to a logical channel identifier (LCH-ID) demultiplexing unit of the MAC unit;
delivering the complete MAC SDUs to the correct logical channel or MAC flow;
discarding stored MAC-ehs SDU segments from a reassembly unit of the MAC unit; and
flushing the re-ordering queue.

2. The method of claim 1, wherein a primitive message is used for the MAC-ehs reset request.

3. The method of claim 1, wherein the MAC unit includes a plurality of re-ordering release timers, and wherein stopping the re-ordering release timer and the MAC-ehs reordering timer comprises:
stopping all active re-ordering release timers; and
setting all of the re-ordering release timers to their initial values.

4. The method of claim 1, wherein the MAC unit includes a plurality of MAC-ehs re-ordering timers, and wherein stopping the re-ordering release timer and the MAC-ehs reordering timer comprises:
stopping all active MAC-ehs re-ordering timers; and
setting all of the MAC-ehs re-ordering timers to their initial values.

5. The method of claim 1, wherein the MAC unit includes a plurality of re-ordering release timers and a plurality of MAC-ehs re-ordering timers, and wherein stopping the re-ordering release timer and the MAC-ehs reordering timer comprises:
stopping all active re-ordering release timers;
setting all of the re-ordering release timers to their initial value;
stopping all active MAC-ehs re-ordering timers; and
setting all of the MAC-ehs re-ordering timers to their initial value.

6. The method of claim 1, further comprising:
receiving, at the RRC unit, an RRC message for notifying the WTRU of a MAC reconfiguration occurring at a serving high speed downlink shared channel (HS-DSCH) cell; and
sending the MAC-ehs reset request on condition that the RRC message includes (i) a high speed MAC (MAC-hs) reset indicator, and (ii) an indication of MAC-hs configuration.

7. The method of claim 6, further comprising: reconfiguring from a MAC-ehs configuration to a MAC-hs configuration in accordance with the indication of MAC-hs configuration.

8. The method of claim 6, wherein the indication of MAC-hs configuration comprises any of (i) an indication of a header format indicative of the MAC-hs configuration, and (ii) configuration information of the MAC of the HS-DSCH cell after reconfiguration.

9. The method of claim 1, further comprising:
receiving, at the RRC unit, an RRC message for notifying the WTRU of a MAC reconfiguration occurring at a serving high speed downlink shared channel (HS-DSCH) cell;
sending, to the MAC unit, information corresponding to the configuration information of the MAC of the HS-DSCH cell after reconfiguration; and
performing a high speed MAC (MAC-hs) reconfiguration or a MAC-ehs reconfiguration in accordance with the information.

10. A wireless transmit/receive unit (WTRU) comprising:
a radio resource control (RRC) unit; and
a medium access control (MAC) unit comprising:
a hybrid automatic repeat request (HARQ) soft buffer;
a re-ordering queue;
a re-ordering release timer and an enhanced high speed MAC (MAC-ehs) re-ordering timer;
a reassembly unit; and
a logical channel identifier (LCH-ID) demultiplexing unit,
wherein the RRC unit is configured to send, to the MAC unit, a MAC-ehs reset request; and
wherein the MAC unit is configured to:
receive, from the RRC unit, a MAC-ehs reset request;
flush the HARQ soft buffer for all configured HARQ processes;
stop the re-ordering release timer and the MAC-ehs re-ordering timer;
perform re-ordering of received MAC-ehs protocol data units (PDUs) using at least one variable;
set the timers and the variable to their initial values;
deliver all re-ordering PDUs in the re-ordering queue to the reassembly unit;
perform reassembly of segmented MAC-ehs service data units (SDUs);
deliver successfully reassembled MAC-ehs SDUs to the LCH-ID demultiplexing unit;
deliver the complete MAC SDUs to the correct logical channel or MAC flow;
discard stored MAC-ehs SDU segments from the reassembly unit; and
flush the re-ordering queue.

11. The WTRU of claim 10, wherein a primitive message is used for the MAC-ehs reset request.

12. The WTRU of claim 10, wherein the MAC unit includes a plurality of re-ordering release timers and a plurality of MAC-ehs re-ordering timers.

13. The WTRU of claim 12, wherein the MAC unit is further configured to:
stop all active re-ordering release timers; and
set all of the re-ordering release timers to their initial values.

14. The WTRU of claim 12, wherein the MAC unit is further configured to:
stop all active MAC-ehs re-ordering timers; and
set all of the MAC-ehs re-ordering timers to their initial values.

15. The WTRU of claim 12, wherein the MAC unit is further configured to:
stop all active re-ordering release timers;
set all of the re-ordering release timers to their initial value;
stop all active MAC-ehs re-ordering timers; and
set all of the MAC-ehs re-ordering timers to their initial value.

16. The WTRU of claim 10, wherein the RRC unit is configured to:
receive an RRC message for notifying the WTRU of a MAC reconfiguration occurring at a serving high speed downlink shared channel (HS-DSCH) cell; and
send the MAC-ehs reset request on condition that the RRC message includes (i) a high speed MAC (MAC-hs) reset indicator, and (ii) an indication of MAC-hs configuration.

17. The WTRU of claim 16, wherein the MAC unit is configured to:
    reconfigure from a MAC-ehs configuration to a MAC-hs configuration in accordance with the indication of MAC-hs configuration.

18. The WTRU of claim 16, wherein the indication of MAC-hs configuration comprises any of (i) an indication of a header format indicative of the MAC-hs configuration, and (ii) configuration information of the MAC of the HS-DSCH cell after reconfiguration.

19. The WTRU of claim 10, wherein:
    the RRC unit is configured to:
        receive an RRC message for notifying the WTRU of a MAC reconfiguration occurring at a serving high speed downlink shared channel (HS-DSCH) cell; and
        send, to the MAC unit, information corresponding to the configuration information of the MAC of the HS-DSCH cell after reconfiguration; and
    the MAC unit is configured to perform a high speed MAC (MAC-hs) reconfiguration or a MAC-ehs reconfiguration in accordance with the information.

20. The WTRU of claim 10, wherein:
    the RRC unit is configured to:
        receive an RRC message for notifying the WTRU of a MAC reconfiguration occurring at a serving high speed downlink shared channel (HS-DSCH) cell; and
        send, to the MAC unit, a primitive message including information corresponding to the configuration information of the MAC of the HS-DSCH cell after reconfiguration; and
    the MAC unit is configured to:
        receive the primitive message; and
        perform a high speed MAC (MAC-hs) reconfiguration or a MAC-ehs reconfiguration in accordance with the information included in the primitive message.

* * * * *

UNITED STATES PATENT AND TRADEMARK OFFICE
CERTIFICATE OF CORRECTION

PATENT NO. : 9,538,425 B2
APPLICATION NO. : 14/956171
DATED : January 3, 2017
INVENTOR(S) : Steven E. Terry et al.

Page 1 of 1

It is certified that error appears in the above-identified patent and that said Letters Patent is hereby corrected as shown below:

In the Specification

At Column 1, Line 18, "2007 ." should be --2007.--
At Column 2, Line 2, """RB" should be --RB--
At Column 3, Line 10, "initiated," should be --initiated--
At Column 3, Line 15, "WRTU" should be --WTRU--
At Column 3, Line 16, "WRTU" should be --WTRU--
At Column 3, Line 17, "WRTU" should be --WTRU--
At Column 3, Line 18, "WRTU" should be --WTRU--
At Column 3, Line 52, "L2 ." should be --L2.--
At Column 3, Line 63, "DPU" should be --PDU--
At Column 4, Line 24, "(PRY)" should be --(PHY)--
At Column 7, Line 14, "RHO" should be --RRC--
At Column 8, Line 9, "WRTU" should be --WTRU--
At Column 8, Line 15, "WRTU" should be --WTRU--
At Column 9, Line 42, "set;" should be --set--
At Column 10, Line 58, "WRTU" should be --WTRU--
At Column 11, Line 5, "all that have" should be --all SDUs that have--
At Column 12, Line 6, "is larger that" should be --is larger than--
At Column 12, Line 9, "is larger that" should be --is larger than--

Signed and Sealed this
Twentieth Day of November, 2018

Andrei Iancu
*Director of the United States Patent and Trademark Office*